A. BERDAN.
Corn-Planter.
No. 21,112. Patented Aug. 10, 1858.
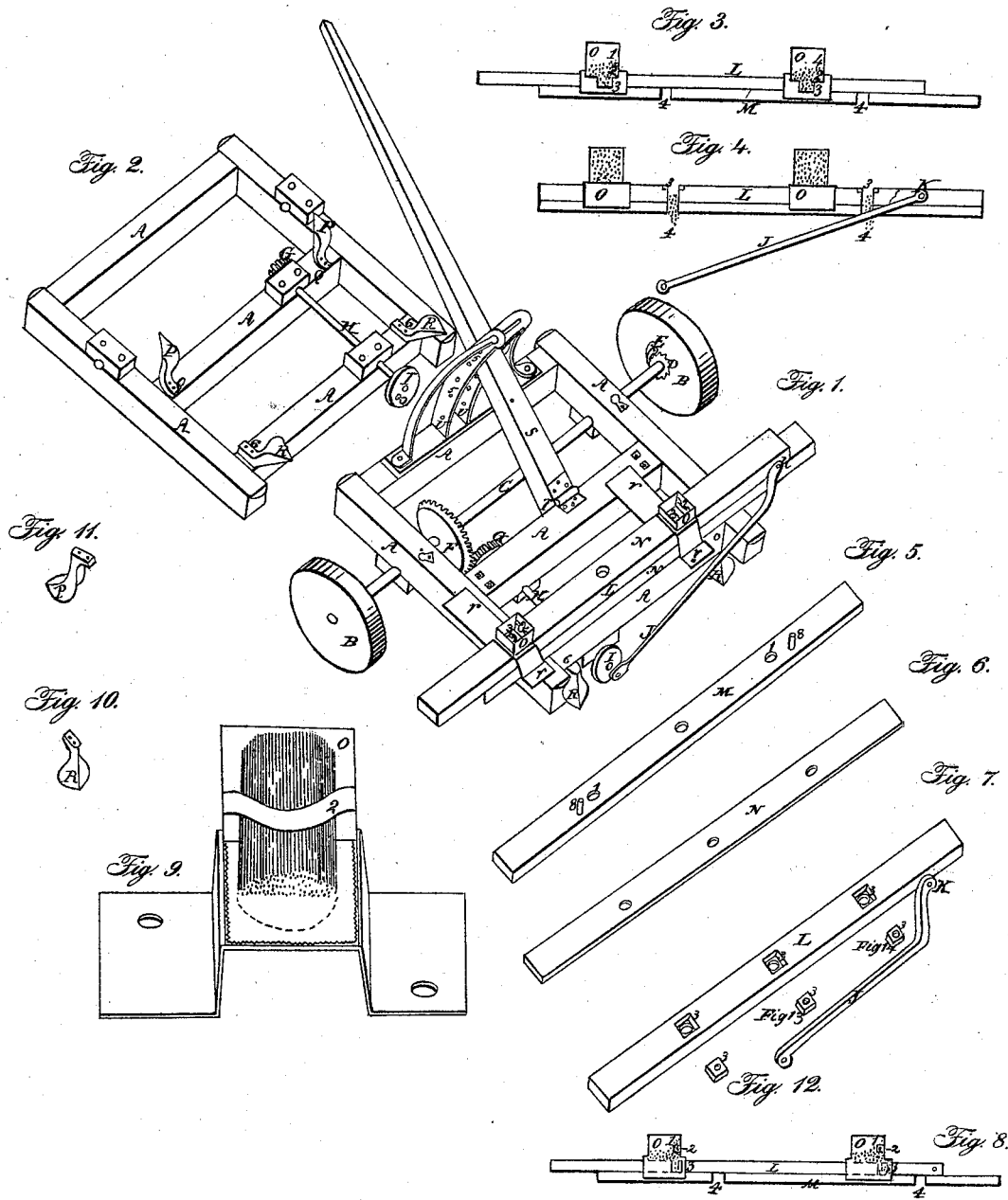
Witnesses:
Inventor:

UNITED STATES PATENT OFFICE.

A. BERDAN, MACON TOWNSHIP, LENAWEE COUNTY, MICHIGAN.

IMPROVEMENT IN SEED-PLANTERS.

Specification forming part of Letters Patent No. 21,112, dated August 10, 1858.

*To all whom it may concern:*

Be it known that I, ADDISON BERDAN, of the township of Macon, in the county of Lenawee and State of Michigan, have invented a new and useful Improvement in Seed-Planters; and I do hereby declare that the following is a full and exact description of the construction and operation thereof, reference being had to the accompanying drawings, and to the letters of reference marked thereon, making a part of this specification.

Figure 1 is a perspective view of the machine, showing it completed and ready for use, constructed of its several parts—namely, the main frame A, drive-wheels B, main shaft C, ratchet-wheel D, pawl E, bevel-wheel F, pinion G, shaft H, crank I, connection J, reciprocating piece L, adjustable tubes 3, stationary piece M, top plates, N, hoppers O, which are attached to main frame A at the numeral 7, covering-teeth R, tongue S, supporters U.

Fig. 2 is a perspective view of the under side of the main frame A, showing the manner in which the teeth P and R are secured to said frame, as seen at Q, and the numeral 6.

Fig. 5 is a perspective view of the stationary piece M removed from the machine, showing the pins 8 that secure it to the main frame A, and showing also the holes 4 through which the seed drop on the ground in the furrow made by the teeth P.

Fig. 7 is a perspective view of the reciprocating piece L, showing the manner in which the tubes 3 are inserted therein, said tubes being adjustable and varying in size to correspond to the seed desired to be planted.

Fig. 9 is an inside view of the hoppers O, showing the brushes described by the numeral 1 and the manner of securing them by the band marked Q.

Fig. 3 shows the reciprocating piece L thrown to the left tile. The tubes 3 are thrown directly under the hoppers O.

Fig. 6 shows the top plate, N, removed from the machine.

Fig. 8 shows the piece L moved to the right a little.

Fig. 4 shows the piece L drawn to the right till the tubes 3 are over the holes 4 in the stationary piece M.

Fig. 11 shows the tooth P removed from the machine.

Fig. 10 shows the tooth R removed from the machine.

Figs. 12, 13, and 14 show the adjustable tubes 3 removed from the reciprocating piece L.

I will describe the operation of my machine as follows: As the machine is drawn along the driving-wheels B give a rotary motion to the main shaft C and bevel-wheel F, that in turn gives a rotary motion to the pinion G, shaft H, and crank I, which in turn give reciprocating motion to the piece L by means of connection J, said connection being pivoted to the piece L at K. When the piece L is thrown to the left by the connection J the adjustable tubes 3 are thrown directly under the hoppers O and receive the seed from the hoppers O through the holes in the top plate, N, as seen in Fig. 3. The seed in the hoppers O is divided from the seed in the tubes 3 by means of the brushes 1, as the piece L moves to the right, as seen in Fig. 8. When the piece L is thrown clear to the right by means of the crank I and connection J the tubes 3 are thrown directly over the holes 4 in the stationary piece M. Then the seed falls to the ground into the furrows made by the tooth P, and is covered by the tooth R, which follows immediately after the seed falls in the furrow. The top plate, N, is moved to the right or left, at the option of the operator, to prevent the seed from escaping from the hoppers O into the tubes 3 when the operator wishes to discontinue planting. The tongue S is hinged to the main frame A at T. Said tongue receives its support right and left by means of the supporting-pieces U, said pieces being perforated with holes, as described by numerals 5, to allow the operator to adjust the height of the machine as he pleases by placing a pin in either of the holes 5. The ratchet-wheel B and the pawl E are to allow the wheel B to turn loose on the shaft C while the machine is in the act of turning around.

What I claim as my invention, and desire to secure by Letters Patent, is—

The arrangement of the reciprocating piece L, adjustable tubes 3, stationary piece M, and top plate, N, with hoppers O, the whole being constructed for operating conjointly as herein set forth.

ADDISON BERDAN.

Witnesses:
CHARLES HEWITT,
D. C. SMITH.